United States Patent
Krings et al.

(10) Patent No.: US 6,966,133 B2
(45) Date of Patent: Nov. 22, 2005

(54) IRON AND SOLE PLATE FOR AN IRON

(75) Inventors: Leo Hubert Maria Krings, Singapore (SG); Youg Ling Wu, Singapore (SG)

(73) Assignees: Koninklijke Philips Electronics N.V., Eindhoven (NL); Singapore Institute of Manufacturing Tech. (SIMTECH), Singapore (SG)

( * ) Notice: Subject to any disclaimer, the term of this patent is extended or adjusted under 35 U.S.C. 154(b) by 335 days.

(21) Appl. No.: 10/257,206

(22) PCT Filed: Feb. 13, 2002

(86) PCT No.: PCT/IB02/00430

§ 371 (c)(1),
(2), (4) Date: Oct. 9, 2002

(87) PCT Pub. No.: WO02/066728

PCT Pub. Date: Aug. 29, 2002

(65) Prior Publication Data

US 2003/0074814 A1    Apr. 24, 2003

(30) Foreign Application Priority Data

Feb. 17, 2001 (SG) .............................. 200100333

(51) Int. Cl.⁷ ............................................. D06F 75/38

(52) U.S. Cl. ........................................................ 38/93

(58) Field of Search .............................. 38/93, 74, 81, 38/77, 78; 219/245, 228, 229; 427/446, 450–456; 428/304.4–315.9

(56) References Cited

U.S. PATENT DOCUMENTS

| | | | |
|---|---|---|---|
| 3,271,653 A | | 9/1966 | Wolf |
| 3,480,461 A | * | 11/1969 | Lynge .......................... 38/77.9 |
| 4,531,705 A | * | 7/1985 | Nakagawa et al. .......... 249/134 |
| 5,592,765 A | * | 1/1997 | Oomen et al. ................. 38/93 |
| 5,749,165 A | * | 5/1998 | Schonborn et al. ............. 38/93 |
| 6,000,157 A | * | 12/1999 | De Beurs et al. ............... 38/93 |

FOREIGN PATENT DOCUMENTS

| | | | | |
|---|---|---|---|---|
| DE | 3644211 A1 | | 8/1987 | ........... D06F 75/38 |
| EP | 0567822 A1 | | 4/1993 | ........... C23C 28/00 |
| GB | 944836 | | 12/1963 | |
| WO | WO 98/13544 | * | 4/1998 | |
| WO | WO 02/066727 | * | 8/2002 | |

* cited by examiner

Primary Examiner—Ismaei Izaguirre

(57) ABSTRACT

Disclosed is an iron, comprising an aluminum sole plate which is provided with a coating which is provided by means of a sol-gel process and wherein an intermediate layer is present between the aluminum sole plate and the sol-gel coating. The intermediate layer comprises a porous layer of aluminum oxide.

Figure 1:
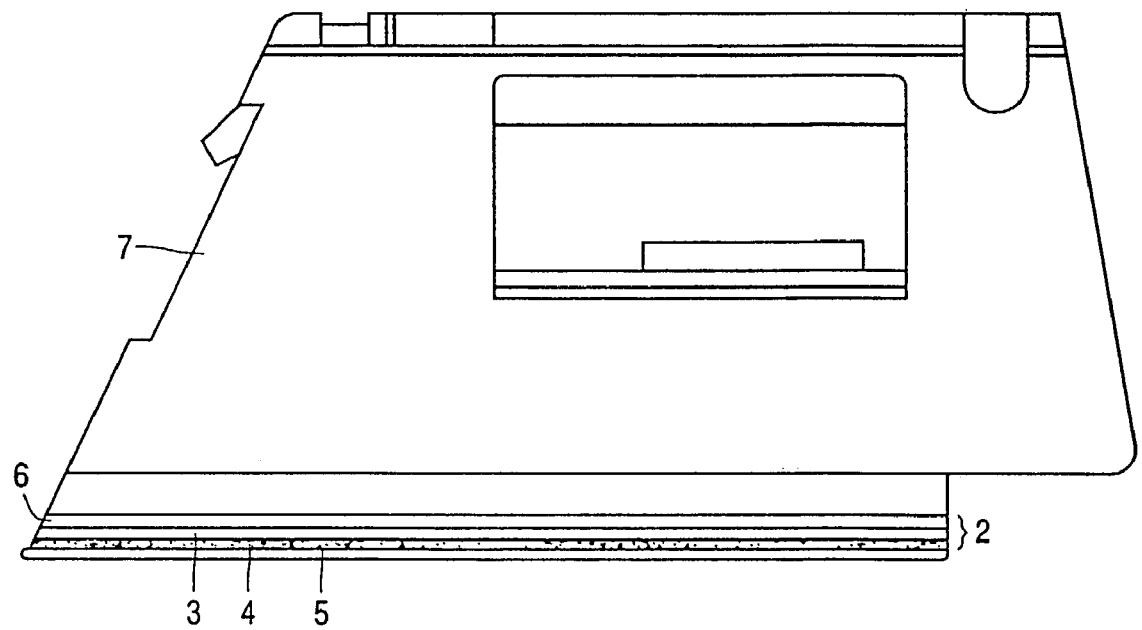

Also described is a method of manufacturing such an iron. The method comprises the steps of providing an aluminum sole plate, applying a porous intermediate layer of aluminum oxide by electrochemical treatment of the aluminum sole plate in an electrolyte comprising a solution of phosphoric acid, and providing a sol-gel coating on the treated sole plate.

Furthermore, an aluminum sole plate which is suitable for use in an iron is disclosed.

9 Claims, 1 Drawing Sheet

IRON AND SOLE PLATE FOR AN IRON

The present invention relates to an iron, comprising an aluminum sole plate which is provided with a coating which is provided by means of a sol-gel process and wherein an intermediate layer is present between the aluminum sole plate and the sol-gel coating. The invention also relates to a method of manufacturing such an iron, as well as to a sole plate which is suitable for use in an iron.

An iron as mentioned in the preamble is known per se, for example from the International application WO 98/13544 as filed by the applicant. Said patent application discloses an iron having an aluminum sole plate which is provided with an anti-friction layer containing an inorganic polymer and which can be provided by means of a sol-gel process. In order to improve the scratch resistance of the anti-friction layer, a hard intermediate layer is provided in-between said layers. Said hard intermediate layer generally has a thickness ranging between 5 and 60 micrometers.

According to WO 98/13544 the optimum thickness of anti-friction layers of the sol-gel type ranges between 5 and 15 micrometers. At a layer thickness above 20 micrometers crack-formation in the sol-gel layer is observed, due to high stresses inside the layer upon drying and curing. These stresses will cause peeling off of the sol-gel layer when the adhesion to the substrate is not good enough.

It is an object of the invention to provide an iron according to the preamble, of which the sole plate can be provided with a sol-gel coating of relatively large thickness, without the risk of peeling off of the sol-gel coating. Moreover, it is an object to provide a method of manufacturing such an iron. Furthermore, the invention should provide a sole plate which can be provided with a relatively thick sol-gel coating without the risk of peeling off of the sol-gel coating.

These and other objects of the invention are achieved by an iron according to the preamble which is characterized in that the intermediate layer comprises a porous layer of aluminum oxide.

Said porous intermediate layer provides for anchor points for the coating to attach to the surface. The sol-gel coating which is applied over the intermediate layer, penetrates into the pores of the aluminum oxide thereby creating some kind of interpenetrating network. It will be clear that by providing a porous layer of aluminum oxide a good mechanical adhesion is assured at the interphase.

The idea behind the invention is, inter alia, to improve adhesion of the sol-gel coating to the aluminum sole plate by increasing the surface roughness of the latter by means of a chemical process.

It is noted that the aluminum sole plate comprises both aluminum and alloys of aluminum.

Another possibility for increasing the surface roughness of the aluminum sole plate is to sand blast the surface. However, although the adhesion of the sol-gel coating is indeed increased, compared to adhesion of the same coating to a non-pretreated aluminum substrate, the improvement is only limited. Moreover, the process of sand blasting involves several disadvantages. One of such disadvantages is the fact that contamination is introduced during the process of sand blasting. Cleaning of the surface in order to remove said contamination is very difficult and time consuming.

In order to obtain an optimum adhesion effect of the coating to the sole plate, the porous intermediate layer of aluminum oxide advantageously has a thickness of at least 0.5 $\mu$m.

The thickness of the porous layer of aluminum oxide is important for both the adhesion of sol-gel coatings to the aluminum substrate as well as the scratch resistance of said sol-gel coatings. In order to obtain good adhesion properties only very thin layers of porous aluminum oxide are needed. The thickness of these layers can be in the order of about 0.5–1 $\mu$m. However, in order to improve the scratch resistance the layer should be at least 3–4 $\mu$m, while thicker layers show even better scratch resistances. In view of the time factor which becomes more important with thicker layers, the porous oxide layers preferably do not exceed 20 $\mu$m.

The intermediate layer according to the present invention is very thin, compared to the thickness of the intermediate layer of WO 98/13544, which is attractive in view of the costs involved.

The application of an aluminum oxide layer to an aluminum sole plate is also known from the European patent EP-B-0 754 256. The most important difference between said patent and the present invention is the fact that in EP-B-0 754 256 the actual ironing surface is determined by an aluminum oxide coating, while in the present invention the actual ironing surface is determined by a sol-gel coating. Contrary to EP-B-0 754 256, the aluminum oxide layer as applied in the iron according to the present invention is porous and acts as an intermediate layer.

In particular, the sol-gel coating has a thickness of 35–90 $\mu$m, preferably 60–70 $\mu$m.

In order to obtain the desired thickness of the sol-gel coating, said coating is advantageously built up of different subsequent layers.

The present invention also relates to a method of manufacturing an iron as disclosed in the above. Said method is characterized in that it comprises the steps of providing an aluminum sole plate, applying a porous intermediate layer of aluminum oxide by electrochemical treatment of the aluminum sole plate in an electrolyte comprising a solution of phosphoric acid, and providing a sol-gel coating on the treated sole plate.

It will be clear that the material of the aluminum sole plate comprises aluminum as well as aluminum alloys. Elements which can be included in such aluminum alloys comprise, for example, silicon, magnesium and other suitable elements known to the skilled person.

The sol-gel coating can be applied in different ways which are known for the person skilled in the art. However, it is preferred to spray the sol-gel coating on the treated aluminum sole plate.

By manufacturing the iron according to the method of the present invention, a mechanical interlocking between the coating and the substrate is obtained. Because of the open pore structure of the porous intermediate layer, the coating will penetrate into the holes.

The use of a porous intermediate layer having a well defined pore structure, appears to be essential for obtaining a good adhesion. It has been shown that electrochemical treatment in a phosphoric acid solution results in a suitable pore structure for assuring good adhesion.

Advantageously, the electrolyte comprises at least 5 v. % phosphoric acid.

The present invention also relates to an aluminum sole plate provided with a coating which is provided by means of a sol-gel process and wherein an intermediate layer is present between the aluminum sole plate and the sol-gel coating, which is suitable for use in an iron. In accordance with the invention the intermediate layer comprises a porous layer of aluminum oxide. It is observed that the invention can both be applied in conventional irons and in steam irons.

The present invention will further be elucidated with reference to the following example and embodiment.

Figure 2:
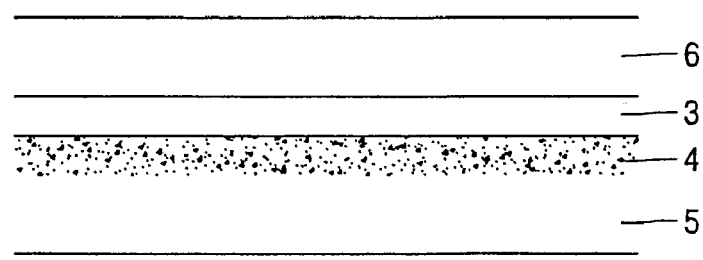

The application comprises a drawing in which:

FIG. 1 schematically shows an iron in accordance with the present invention; and FIG. 2 schematically shows an enlarged detail of the sole plate of the iron in accordance with the present invention.

It is noted that the various elements of the iron or the sole plate, as shown in FIG. 1 and FIG. 2 respectively, are purely schematic and are not drawn to scale.

FIG. 1 is a schematic side view of an iron according to the present invention. Said iron comprises a housing (1) which can be made of a plastic material. The bottom side of the housing is provided with a metal sole plate (2). In the present embodiment, the sole plate is made of a block (6) of die-castable aluminum to which a thin plate (3) of aluminum is secured. This thin plate (3) is also referred to as the ironing plate. As mentioned earlier, the aluminum plate can comprise aluminum as well as an aluminum alloy.

The surface of the ironing plate (3) facing away from the housing (1) is provided with a porous layer of aluminum oxide (4). Said porous oxide layer (4) acts as a primer layer in order to provide for a good adhesion of the sol-gel coating (5) which is applied on top of the porous layer (4). The thickness of the aluminum oxide layer is about 4 $\mu$m. The sol-gel coating (5) has a thickness of about 65 $\mu$m. The sol-gel coating is built up of three layers, namely a first basic coating of 35 $\mu$m, a second basis coating of 20 $\mu$m and a top coating of 10 $\mu$m.

FIG. 2 shows in more detail the sequence of the layers of the sole plate (2).

In another advantageous embodiment both sides of the ironing plate (3) are provided with a porous layer of aluminum oxide (4) (not shown in FIGS. 1 and 2). The presence of a porous aluminum oxide layer (4) at the side of the ironing plate (3) facing the housing (1) is useful because this side of the ironing plate (3) facing the housing—and thus the steam chamber in case of a steam iron—will be sealed using a silicon paste. As a result of the presence of the porous oxide layer the sealing properties of the silicon paste will be improved.

EXAMPLE 1

A Method of Manufacturing the Iron According to the Present Invention.

An ironing plate of an aluminum alloy is first degreased in a suitable detergent and subsequently etched in an acidic solution, such as nitric acid, or in an alkaline solution, such as sodium hydroxide, in order to activate and to clean the surface. Thereafter, the ironing plate is rinsed with tap water and deionised water and the plate is immersed in an electrolyte solution of 15 vol. % phosphoric acid. The temperature of the electrolyte solution is about 25° C.

The ironing plate is connected as the anode and a stainless steel counter electrode is used as the cathode. A current density of 1.0 A/dm$^2$ is applied and maintained throughout the process. After 30 minutes the current is switched off and the ironing plate is taken out of the solution, rinsed with demineralised water and dried by blowing with hot air of 80° C. During the electrochemical process both sides of the ironing plate are provided with a porous layer of aluminum oxide.

After said pretreatment of the aluminum ironing plate, a three layer sol-gel coating is applied by spray coating and cured in an oven at 350° C. for about 15 minutes. Subsequently the ironing plate can be sealed to the block (6) of die-castable aluminum.

EXAMPLE 2

This example shows the improved adhesion and scratch resistance of sol-gel coatings to aluminum surfaces which are electrochemically provided with a porous layer of aluminum oxide, compared to the adhesion of sol-gel coatings to aluminum surfaces which are roughened by means of sand blasting.

Two ironing plates were prepared. Ironing plate I was prepared according to example 1, while ironing plate II was prepared in a similar way, except that the electrochemical treatment was replaced by sand blasting.

The adhesion of the sol-gel coating to the ironing plate is tested by bending the ironing plate at an angle of 90° around a sharp corner. The visible damage at the distorted area gives a measure of the adhesion. This is classified in a range from 0 to 5. Grade 0 means that no adhesion has taken place, in other words peeling off of the coating,even wothout bending. Grade 5 refers to a very good adhesion; at bending only very little damage, only crackss visible at the edges of the distorted area.

Ironing plate I received a grade 5, while ironing plate II only got grade 3.

Forces were applied to both ironing plate I and ironing plate II and the scratch through of the coating was measured. It appears that in order to scratch through the coating of iroining plate I a force of 3.0–3.5 kg was needed, while the coating of iroining plate II was already scratch through with 2.0–2.5 kg.

Thus sole plate I—the electrochemically treated sole plate-shows an improved adhesion and scratch resistance of the sol-gel coating.

What is claimed is:

1. An iron, comprising an aluminum sole plate which is provided with a coating which is provided by means of a sol-gel process and wherein an intermediate layer is present between the aluminum sole plate and the sol-gel coating, characterized in that the intermediate layer comprises a porous layer of aluminum oxide.

2. An iron according to claim 1, characterized in that the porous intermediate layer of aluminum oxide has a thickness of at least 0,5 .mu.m and less than 20,0 .mu.m.

3. An iron according to claim 1, characterized in that the sol-gel coating has a thickness of 35–90 .mu.m.

4. An iron according to claim 3, characterized in that the coating has a thickness of 60–70 .mu.m.

5. An iron according to claim 1, characterized in that the coating is built up of different subsequent layers.

6. A method of manufacturing an iron as claimed in claim 1, the method comprising the acts of:
   providing an aluminum sole plate,
   applying a porous intermediate layer of aluminum oxide by electrochemical treatment of the aluminum sole plate in an electrolyte comprising a solution of phosphoric acid, and
   providing a sol-gel coating on the treated sole plate.

7. A method according to claim 6, characterized in that the electrolyte comprises at least 5 v. % phosphoric acid.

8. An aluminum sole plate provided with a coating which is provided by means of a sol-gel process and wherein an intermediate layer is present between the aluminum sole plate and the sol-gel coating, which is suitable for use in an iron as claimed in claim 1.

9. A method of manufacturing an iron comprising an aluminum sole plate which is provided with a coating which is provided by means of a sol-gel process and wherein an intermediate layer is present between the aluminum sole plate and the sol-gel coating, characterized in that the intermediate layer comprises a porous layer of aluminum oxide, the method comprising the acts of:

providing said aluminum sole plate, applying said porous intermediate layer of aluminum oxide by electrochemical treatment of the aluminum sole plate in an electrolyte comprising a solution of at least 5 v. % phosphoric acid, and providing said sol-gel coating on the treated sole plate.

* * * * *